P. WARNER.
Dropping Platforms for Harvesters.
No. 144,239. Patented Nov. 4, 1873.
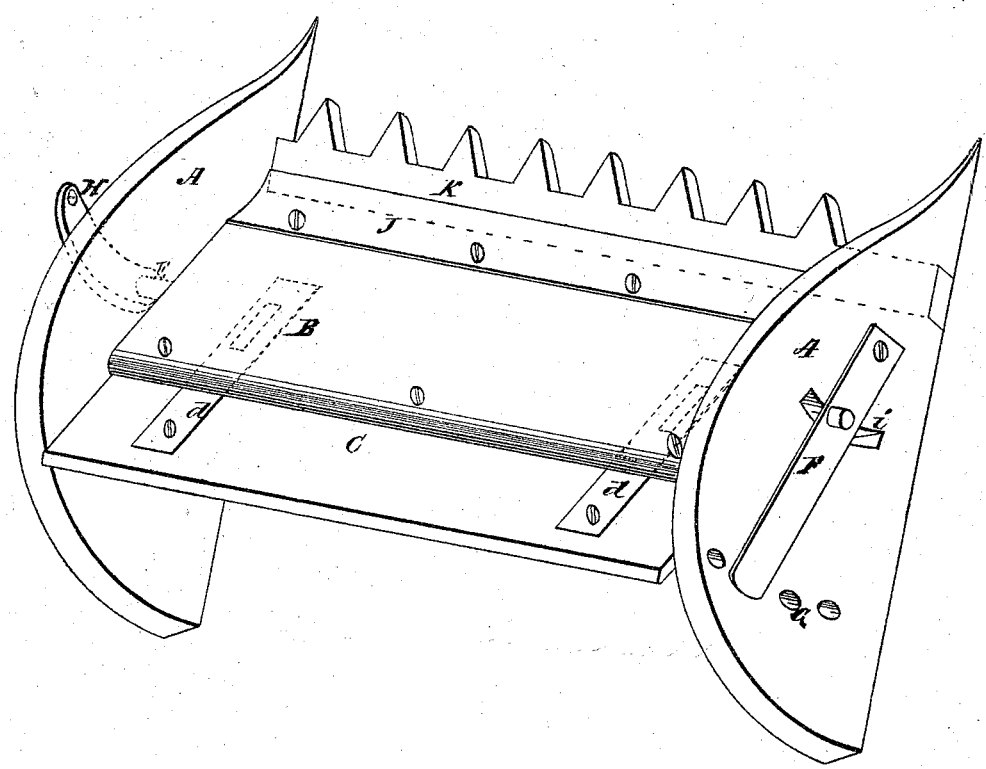
Witnesses
W. H. Compton
Ransom Compton
Inventor
Peter Warner

UNITED STATES PATENT OFFICE.

PETER WARNER, OF GILEAD, MICHIGAN.

IMPROVEMENT IN DROPPING-PLATFORMS FOR HARVESTERS.

Specification forming part of Letters Patent No. 144,239, dated November 4, 1873; application filed August 16, 1873.

*To all whom it may concern:*

Be it known that I, PETER WARNER, of Gilead, county of Branch, State of Michigan, have invented a new and Improved Grain-Table; and I do hereby declare that the following is a full, clear, and exact description of the same, reference being had to the accompanying drawing forming a part of the specification.

The invention relates to grain-tables or dropping-platforms; and consists in an improved construction, as hereinafter fully described, and pointed out in the claim.

A A represent the side boards, and B C the platform, made in two parts. The part B is the front portion, designed to be about twenty inches wide, and varying in length to fit the different machines upon which it may be used. The back part C, designed to be about fifteen inches wide, is connected to the part B by irons $d\ d$, permanently attached to part C by bolts, and having slots in their front ends, through which pass bolts into the part B. This construction permits the width of the platform to be changed at pleasure, to adapt it to different lengths of grain. The platform is supported upon journals E E upon the ends of a cross-piece rigidly attached to the part B. These journals pass through slots $i\ i$ in the side boards A A, and are supported in arms F F, pivoted at their front ends to the side boards, and provided at their outer ends with a spur, which engages with a series of holes, $a$, at the rear of the side boards. When it is desired to adjust the platform to different heights, the arms F are sprung outward, and then moved up or down to the required position, when, by the force of the spring, the spur on the end of the arms engages with one of the holes $a$, and retains the platform in place. H is a lever attached to one of the journals E, for the purpose of tilting the platform when the machine is in operation. J is a sheet-iron plate fastened to the upper front edge of the part B. This plate rests on the rear part of the finger-bar K while the cut grain is accumulating on the platform.

It will be perceived that the construction above described permits the platform to be readily adjusted, both in width and in height, to suit the different conditions of the crop to be cut and deposited in bundles on the ground.

Having thus described my invention, what I claim as new, and desire to secure by Letters Patent, is—

The pivoted platform or table having its bearings supported in adjustable arms, and arranged to operate substantially as and for the purpose described.

PETER WARNER.

Witnesses:
W. H. COMPTON,
RANSOM COMPTON.